US008121981B2

(12) United States Patent
Simek et al.

(10) Patent No.: US 8,121,981 B2
(45) Date of Patent: Feb. 21, 2012

(54) DATABASE SNAPSHOT MANAGEMENT

(75) Inventors: Patrick J. Simek, Redmond, WA (US); Elisabeth Katarina Olson, Bellevue, WA (US); Samer Fouad Sawaya, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 12/142,756

(22) Filed: Jun. 19, 2008

(65) Prior Publication Data

US 2009/0319582 A1 Dec. 24, 2009

(51) Int. Cl.
*G06F 7/00* (2006.01)

(52) U.S. Cl. ........ 707/649; 707/695; 707/680; 707/681; 707/682; 711/162

(58) Field of Classification Search .................. 707/649, 707/695, 680–682; 711/162
See application file for complete search history.

(56) References Cited

U.S. PATENT DOCUMENTS

| | | | |
|---|---|---|---|
| 5,963,959 A | 10/1999 | Sun et al. | |
| 6,289,335 B1 | 9/2001 | Downing et al. | |
| 6,473,775 B1 | 10/2002 | Kusters et al. | |
| 6,981,114 B1 * | 12/2005 | Wu et al. | 711/162 |
| 7,237,080 B2 | 6/2007 | Green et al. | |
| 7,568,080 B2 * | 7/2009 | Prahlad et al. | 711/162 |
| 7,904,425 B2 * | 3/2011 | Cannon et al. | 707/654 |
| 2002/0083037 A1 | 6/2002 | Lewis et al. | |
| 2003/0220929 A1 | 11/2003 | Tolpin et al. | |
| 2003/0220935 A1 | 11/2003 | Vivian et al. | |
| 2006/0230079 A1 | 10/2006 | Strahl et al. | |
| 2007/0100917 A1 * | 5/2007 | Amano et al. | 707/205 |
| 2008/0071575 A1 | 3/2008 | Climax et al. | |
| 2009/0249005 A1 * | 10/2009 | Bender et al. | 711/162 |

OTHER PUBLICATIONS

"NDMP v4 Snapshot management", Lawrence et al. copyright the Internet Society 2001.*
"Creating a Database Snapshot", Sep. 2007, Microsoft Corporation, pp. 2.
"Creating an SQL Snapshot of a SharePoint Content Database", 2008, Microsoft Corporation, p. 1.
"SQL Server 2005—Using Database Snapshots", 2008, Exforsys.com, pp. 3.
Nichter, "Achieve High Availability for SQL Server", TechNet Magazine, SQL Server Tune-Up, Mar. 2007, pp. 29-38.

* cited by examiner

*Primary Examiner* — Apu Mofiz
*Assistant Examiner* — Cindy Nguyen
(74) *Attorney, Agent, or Firm* — Hope Baldauff Hartman, LLC

(57) ABSTRACT

Technologies are described herein for managing database snapshots. One user interface is provided for managing the automated creation and deletion of database snapshots. Parameters are received through the user interface that define how the database snapshots should be created and deleted. Once the parameters are defined, a timer job is executed that causes a DBMS to create and delete the database snapshots according to the specified parameters. A user interface is also provided for manually managing the creation, deletion, and restoration of database snapshots. A request may be received through this user interface to recover data from a database snapshot. In response to such a request, another user interface is provided for specifying the data that should be recovered. Once the data to be recovered has been specified, the desired data is recovered from the database snapshot.

18 Claims, 8 Drawing Sheets

DATABASE SNAPSHOT MANAGEMENT SETTINGS

USE THIS PAGE TO MANAGE THE DATABASE SNAPSHOTS ON YOUR CONTENT DATABASES FOR EACH WEB APPLICATION.

WEB APPLICATION
SELECT A WEB APPLICATION.

WEB APPLICATION: [HTTP://ACME/ ▶] — 202

ENABLE SNAPSHOT MANAGEMENT
ENABLE THE AUTOMATED MANAGEMENT OF DATABASE SNAPSHOTS FOR THIS WEB APPLICATION. A TIMER JOB WILL BE USED TO CREATE AND DELETE SNAPSHOTS.

204 — [✓] ENABLE SNAPSHOT MANAGEMENT

NUMBER OF SNAPSHOTS TO KEEP
SPECIFY HOW MANY DATABASE SNAPSHOTS TO ALLOW PER DATABASE.

NUMBER OF SNAPSHOTS TO KEEP
[0] — 206

SCHEDULE SNAPSHOT CREATION
SPECIFY HOW FREQUENTLY DATABASE SNAPSHOTS SHOULD AUTOMATICALLY BE CREATED.

208 — CREATE SNAPSHOT EVERY: [1] HOURS — 212

HOW LONG TO KEEP SNAPSHOTS
SPECIFY THE MAXIMUM TIME TO KEEP SNAPSHOTS.

DURATION
[                    ] — 210

WHERE WILL SNAPSHOTS BE STORED
SPECIFY A PATH FOR STORING SNAPSHOTS.

PATH
[                    ]

[OK] — 214    [CANCEL] — 216

DATABASE SNAPSHOT MANAGEMENT SETTINGS

USE THIS PAGE TO CREATE AND MANAGE DATABASE SNAPSHOT FOR EACH OF THE CONTENT DATABASES PER WEB APPLICATION. DATABASE SNAPSHOTS ALLOW YOU TO PRESERVE THE CONTENTS OF YOUR DATABASE AT A SPECIFIC POINT IN TIME. YOU CAN RESTORE THAT SPECIFIC POINT IN TIME SNAPSHOT BACK TO YOUR LIVE SERVER.

SNAPSHOT AUTOMATIC CLEANUP JOB IS RUNNING. SNAPSHOTS OLDER THAN 12 HOURS WILL BE DELETED.

WARNING: THE USE OF SNAPSHOTS WILL DECREASE DATABASE PERFORMANCE.

| SNAPSHOT ALL DATABASES | REFRESH | SNAPSHOT | DELETE ALL SNAPSHOTS | WEB APPLICATION: HTTP://ACME/ ▶ |
|---|---|---|---|---|
| DATABASE NAME | | | | SNAPSHOT TIME |
| NAME: WSS_CONTENT | | | | |
| WSS_CONTENT | | WSS_CONTENT_39393.06016 | | 11/9/2007 1:26:38 AM |
| WSS_CONTENT | | WSS_CONTENT_39393.06022 | | 11/9/2007 1:26:43 AM |
| WSS_CONTENT | | WSS_CONTENT_39393.06692 | | 11/9/2007 1:36:22 AM |
| WSS_CONTENT | | WSS_CONTENT_39393.06706 | | 11/9/2007 1:36:34 AM |
| WSS_CONTENT | | WSS_CONTENT_39393.50530 | | 11/9/2007 12:07:38 PM |
| WSS_CONTENT | | WSS_CONTENT_39393.71979 | | 11/9/2007 5:13:53 PM |
| WSS_CONTENT | | WSS_CONTENT_39393.77747 | | 11/9/2007 6:39:33 PM |
| WSS_CONTENT | | WSS_CONTENT_39393.77752 | | 11/9/2007 6:39:37 PM |
| NAME: WSS_CONTENT_42 | | | | |
| WSS_CONTENT_42 | | <<<NO SNAPSHOTS AVAILABLE.>>> | | |

*Fig. 4*

DATABASE SNAPSHOT MANAGEMENT SETTINGS

USE THIS PAGE TO CREATE AND MANAGE DATABASE SNAPSHOT FOR EACH OF THE CONTENT DATABASES PER WEB APPLICATION. DATABASE SNAPSHOTS ALLOW YOU TO PRESERVE THE CONTENTS OF YOUR DATABASE AT A SPECIFIC POINT IN TIME. YOU CAN RESTORE THAT SPECIFIC POINT IN TIME SNAPSHOT BACK TO YOUR LIVE SERVER.

SNAPSHOT AUTOMATIC CLEANUP JOB IS RUNNING. SNAPSHOTS OLDER THAN 12 HOURS WILL BE DELETED.

WARNING: THE USE OF SNAPSHOTS WILL DECREASE DATABASE PERFORMANCE.

| SNAPSHOT ALL DATABASES | REFRESH | DELETE ALL SNAPSHOTS | WEB APPLICATION: | HTTP://ACME/ ▶ |
|---|---|---|---|---|
| DATABASE NAME | | SNAPSHOT | | SNAPSHOT TIME |
| NAME: WSS_CONTENT ▶ | | | | |
| CREATE NEW SNAPSHOT | | WSS_CONTENT_39393.06016 | | 11/9/2007 1:26:38 AM |
| DELETE ALL SNAPSHOT FOR DB | | WSS_CONTENT_39393.06022 | | 11/9/2007 1:26:43 AM |
| WSS_CONTENT | | WSS_CONTENT_39393.06692 | | 11/9/2007 1:36:22 AM |
| WSS_CONTENT | | WSS_CONTENT_39393.06706 ▶ | | 11/9/2007 1:36:34 AM |
| WSS_CONTENT | | EXPLORE OR RECOVER DATA | | 11/9/2007 12:07:38 PM |
| WSS_CONTENT | | DELETE SNAPSHOT | | 11/9/2007 5:13:53 PM |
| WSS_CONTENT | | RESTORE TO DATABASE | | 11/9/2007 6:39:33 PM |
| WSS_CONTENT | | | | 11/9/2007 6:39:37 PM |
| NAME: WSS_CONTENT_42 | | | | |
| WSS_CONTENT_42 | | <<<NO SNAPSHOTS AVAILABLE.>>> | | |

*Fig. 5*

DATABASE SNAPSHOT MANAGEMENT

BACKGROUND

Large amounts of data are stored in databases. In many cases this data is extremely valuable and would be difficult or even impossible to replace if lost. As a result, many database administrators regularly back up their databases to a second storage medium or even to another geographic location. Database backups may include regular full backups and daily incremental backups. This type of database backup process is typically an integral part of the information technology workflow of an organization.

In many cases, however, it is necessary to have a more frequent record of a database than the daily incremental backups provide. For a more granular record of a database, many database administrators utilize database snapshots. Database snapshots are a feature of some database management systems ("DBMS") and allow a user to specify a point in time at which to preserve the contents of the database. Because database snapshots are quick to create and require relatively little storage space, they are ideal for creating the fine-grained record of a database desired by database administrators. Database snapshots should not, however, be used to replace the regular full and incremental backups of a database because the original database must be intact for a database snapshot to be restored.

Despite the usefulness of database snapshots, the complexity in creating, deleting, and restoring snapshots generally limits their use only to database administrators having sophisticated knowledge of the operation of the underlying DBMS. As a result, computer users without this sophisticated knowledge cannot create, delete, or restore snapshots of the databases that they work with. Moreover, no DBMS currently provides functionality for restoring a subset of the data within a database snapshot. As a result, it is currently necessary to restore an entire database snapshot even when it is only desirable to restore a small portion of the data contained within a database snapshot.

It is with respect to these considerations and others that the disclosure made herein is presented.

SUMMARY

Technologies are described herein for database snapshot management. In particular, through the implementation and use of the technologies provided herein, database snapshots can be managed without sophisticated knowledge regarding the operation of a DBMS. Moreover, a subset of the data contained within a database snapshot can be restored to a database.

According to one aspect presented herein, a user interface is provided for managing the automated creation and deletion of database snapshots by a DBMS. Parameters are received through the user interface that define the manner in which the DBMS should create and delete the database snapshots. Once the parameters have been defined, a timer job is executed that instructs the DBMS to create and delete the database snapshots according to the specified parameters. The timer job is a process that executes according to a pre-defined schedule.

According to aspects, the user interface for managing the automated creation and deletion of database snapshots may receive parameters defining an application and a corresponding content database for which database snapshots should be created and deleted. The received parameters may also define the maximum number of database snapshots that should be retained at any point in time, the frequency at which the database snapshots should be created, and the maximum period of time the database snapshots should be maintained prior to deletion. Other parameters may also be received, such as data defining a location for storing the database snapshots.

According to other aspects, a user interface may also be provided for manually managing the creation, deletion, and restoration of database snapshots. Through this user interface, requests may be received to create a database snapshot, delete a database snapshot, or restore a database snapshot to the database. Additionally, in one embodiment, a request may be received through this user interface to recover data from a database snapshot. In response to receiving such a request, another user interface is provided for specifying the data that should be recovered. Once the data to be recovered has been specified, the desired data is recovered from the database snapshot. In this manner, a subset of the data contained within a database snapshot can be retrieved. In embodiments, the functionality accessible through the user interface may also be accessed through a command line or a programmable object model.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a user interface diagram showing aspects of a user interface provided in one embodiment for configuring automated database snapshot management;

FIGS. 4-5 are user interface diagrams showing aspects of a user interface provided in one embodiment for manually managing database snapshots;

DETAILED DESCRIPTION

Figure 1:
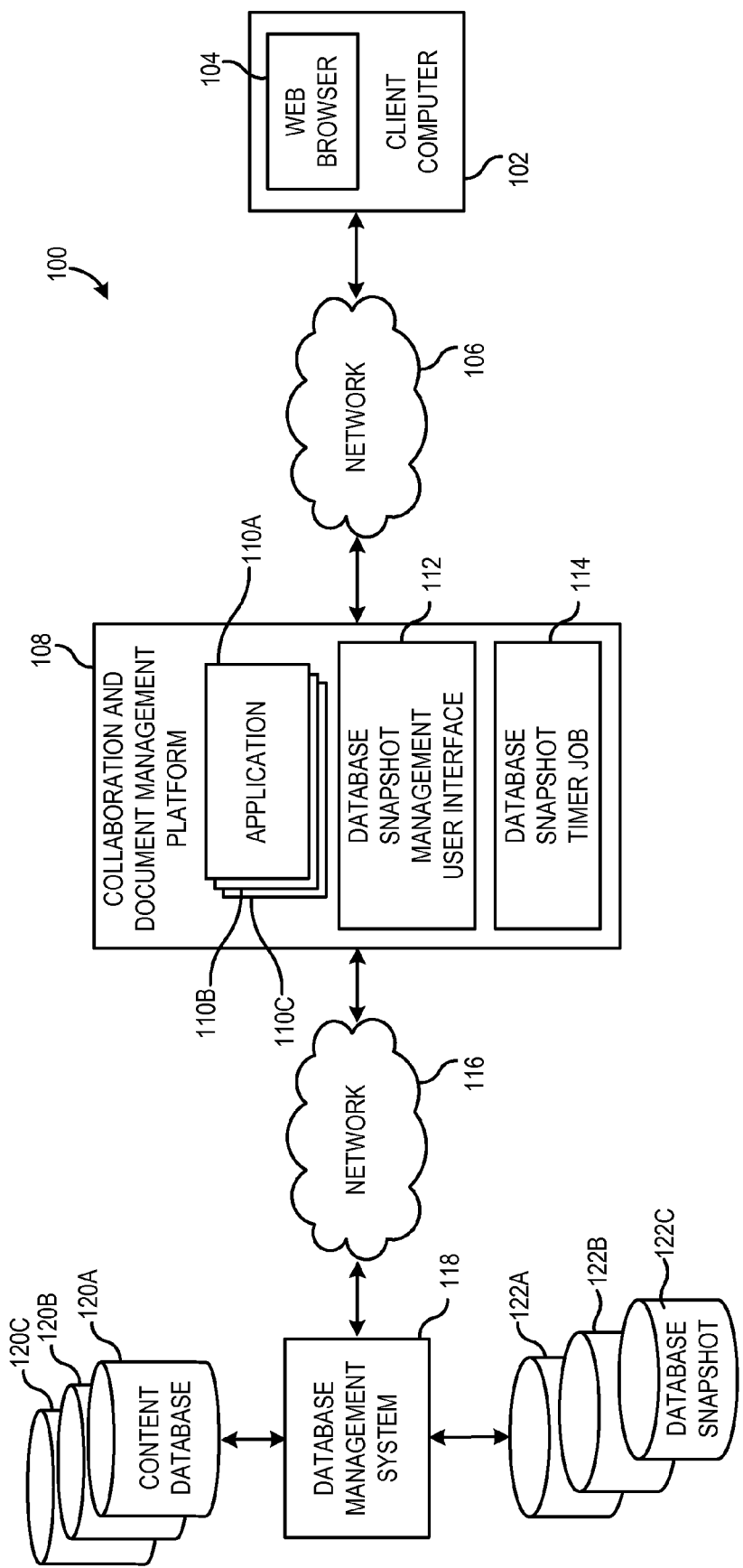
FIG. 1 is a network and software architecture diagram showing aspects of an illustrative operating environment and several software components provided by the embodiments presented herein.

The following detailed description is directed to technologies for database snapshot management. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for database snapshot management will be described.

Turning now to FIG. 1, details will be provided regarding an illustrative operating environment and several software components provided by the embodiments presented herein. In particular, FIG. 1 shows aspects of a system 100 for database snapshot management. The system 100 includes a client computer 102, a collaboration and document management platform 108 (the "platform"), and a DBMS 118, all of which are interconnected by one or more networks, such as the network 106 and the network 116. It should be appreciated that the platform 108 and the DBMS 118 may be implemented utilizing many different computing systems and that more or fewer network interconnections may be utilized than illustrated in FIG. 1.

According to one implementation, the platform 108 comprises a web-based collaboration and document management platform. The platform 108 can be utilized to host World Wide Web ("web") sites that can be utilized to access shared workspaces and documents, as well as specialized applications from within a web browser 104. Through this functionality, any number of applications 110A-110C can be made available to a user of the web browser 104 by the platform 108. It should be appreciated that the concepts and technologies presented herein may be utilized with an web site that utilizes a database backend.

The platform 108 and each of the applications 11A-110C may store content and other data within a database. This functionality is provided by the DBMS 118. In particular, the applications 11A-110C may store data within respective content databases 120A-120C. Other types of databases may also be used by the platform 108 for storing configuration information and other types of data.

According to one implementation, the platform 108 comprises the WINDOWS SHAREPOINT SERVICES collaboration and document management platform from MICROSOFT CORPORATION of Redmond, Wash. According to other implementations, the platform 108 comprises the MICROSOFT OFFICE SHAREPOINT SERVER collaboration and document management platform, also from MICROSOFT CORPORATION. It should be appreciated however, that the embodiments presented herein may be utilized with any type of application that stores data within a database.

According to embodiments, the DBMS 118 comprises one or more software programs that control the organization, storage, management, and retrieval of data within a database, such as the content databases 120A-120C. The DBMS 118 utilized in embodiments herein also provides functionality for creating database snapshots 122A-122C of the respective databases 120A-120C. As known to those skilled in the art, database snapshots are a feature of some DBMSs that allow a user to specify a point in time at which to preserve the contents of a database. Taking a snapshot of a database does not, however, actually make a copy of the data. Rather, a new database is created that is prepared to receive contents from the live database as the contents are replaced, changed, or overwritten. When a database snapshot 122 is restored onto a database, the previous values are reapplied to the live database thereby bringing the database back to the state it was in at the point in time that the database snapshot was taken.

According to one implementation, the DBMS 118 comprises the Enterprise And Developer Edition of the SQL 2005 DBMS from MICROSOFT CORPORATION. It should be appreciated, however, that the DBMS 118 may comprise any type of DBMS that provides functionality for creating snapshots of a database from any vender.

As will be described in greater detail below, the platform 108 is configured in one implementation to provide a user interface 112 ("UI") for managing the creation, deletion, and restoration of the database snapshots 122A-122C by the DBMS 118. In particular, the user interface 112 provides functionality for allowing a user to manage the automated creation and deletion of the database snapshots 122A-122C by the DBMS 118.

Through the user interface 112, a user can provide one or more parameters that define the manner in which the database snapshots 122A-122C should be created by the DBMS 118. For instance, a user may specify a parameter defining a maximum number of database snapshots 122 that should be maintained by the DBMS 118. The user may also supply a parameter defining a frequency at which the database snapshots 122 should be created. Another parameter may be defined that identifies a maximum period of time that the database snapshots 122A-122C should be maintained by the DBMS 118 prior to deletion. The user may also be permitted to specify details regarding the applications 110A-110C and content databases 120A-120C that the database snapshots 122A-122C should be created and deleted for. Other parameters may allow the user to specify a location for storing the database snapshots 122A-122C and other parameters utilized by the DBMS 118 in the creation and deletion of the database snapshots 122A-122C.

As will also be described in greater detail below, the platform 108 utilizes a database snapshot timer job 114 to implement the automated creation and deletion of the database snapshots 122A-122C in the manner specified by the user. The timer job 114 is a process that executes automatically on the platform 108 according to a predefined schedule. For instance, the timer job 114 may be configured to wake up and execute once every hour. When executed, the timer job 114 determines whether any database snapshots 122 should be created or deleted. This determination is made based upon the parameters specified through the user interface 112. If a snapshot should be created, the timer job 114 transmits an instruction to the DBMS 118 requesting that the snapshot be created in the manner specified by the user. An illustrative command for creating a database snapshot is illustrated in Table 1.

TABLE 1

CREATE DATABASE <snapshot name> ON
(NAME = N'<logical file name>',

TABLE 1-continued

FILENAME = N'<file path>\<snapshot name>.snap')
AS SNAPSHOT OF <name of content DB>;

When a snapshot should be deleted, the timer job 114 transmits an appropriate instruction to the DBMS 118 for deleting the snapshot 122. One illustrative instruction for deleting a database snapshot is illustrated in Table 2.

TABLE 2

DROP DATABASE <snapshot name>

Additional details regarding the aspects of the user interface 112 for defining the automated creation and deletion of the database snapshots 122 will be provided below with respect to FIG. 2. Additional details regarding the execution and operation of the timer job 114 will be provided below with respect to FIG. 3.

According to other aspects presented herein, the user interface 112 also provides functionality for allowing a user to manually manage the creation, deletion and restoration of the database snapshots 122A-122C. For instance, through this aspect of the user interface 112, a user may manually request that a database snapshot 122 be created for one of the applications 110A-110C or content databases 120A-120C. In response to receiving such a request, the platform 108 transmits an instruction to the DBMS 118 to create the new database snapshot 122 in the manner requested by the user. An instruction such as that illustrated above in Table 1 may be utilized to cause the DBMS 118 to create the requested database snapshot 122.

Through the user interface 112, a user may also manually make a request to delete one of the database snapshots 122A-122C. In response to such a request, the platform 108 transmits an instruction to the DBMS 118 to delete the identified snapshot 122. An illustrative instruction such as that shown above in Table 2 may be utilized in this regard. Through this aspect of the user interface 112, a user may also manually request that one of the database snapshots 122A-122C be restored onto an appropriate content database 120A-120C. In response to receiving such a request, the platform 108 transmits an instruction to the DBMS 118 to restore the appropriate database snapshot 122 onto the proper content database 120. An illustrative instruction for restoring one of the database snapshots 122A-122C is illustrated in Table 3.

TABLE 3

RESTORE DATABASE <name of content DB>
from DATABASE_SNAPSHOT = '<snapshot name>'

According to one implementation, the UI 112 also provides functionality for allowing the user to request that data be recovered from one of the database snapshots 122A-122C. Through this user interface, a user may manually specify a subset of the data contained within one of the database snapshots 122A-122C that should be recovered. In response to such a request, the platform 108 retrieves the requested data from the identified database snapshot 122A-122C and stores the data in a specified location. The recovered data may then be imported into one of the content databases 120A-120C or utilized in another manner. Additional details regarding the aspects of the user interface 112 for allowing a user to manually create, delete, restore, and recover the database snapshots 122A-122C will be provided below with respect to FIGS. 4-6.

Referring now to FIG. 2, additional details regarding the functionality provided by the database snapshot management user interface 112 for allowing a user to manage the automated creation and deletion of the database snapshots 122A-122C will be described. In particular, a user interface 200 is provided in one implementation through which a user can specify one or more parameters regarding the automated creation and deletion of the database snapshots 122A-122C. As discussed above, the user interface 200 may be utilized to specify the parameters utilized by the timer job 114 to cause the DBMS 118 to create and delete the database snapshots 122A-122C.

According to one implementation, the user interface 200 includes a user interface control 202 that allows a user to specify which of the applications 110A-110C that database snapshot should be created for. A user interface control 204 is also provided for allowing a user to indicate that the database snapshots for the selected application should be created by the timer job 114 in an automated fashion. A user interface control 206 is also provided for allowing a user to specify a parameter indicating how many database snapshots should be maintained at any given time. If the number of database snapshots 122A-122C exceeds this number, the timer job 114 will cause the older snapshots to be deleted until the proper number of database snapshots 122 are present.

According to other aspects, the user interface 200 includes a control 208 that allows a user to specify a parameter defining the frequency at which the database snapshots 122 should be created. This parameter may be specified in hours or other units of time. Through the control 210 a user may also specify a parameter indicating a storage location for storing the database snapshots 122. For instance, a path on a file server or other type of storage system may be specified utilizing the control 210. A parameter may also be specified utilizing the control 212 that defines a maximum period of time that the database snapshots 122 should be maintained prior to deletion. This parameter may also be specified in hours, days, or other units of time.

When a user has completed defining the parameters indicated above through the user interface 200, the user may select the control 214 to save the parameters. The user may also select the control 216 to cancel the specified parameters. If the user accepts the parameters through the selection of the control 214, the parameters are saved by the platform 108. Additionally, the timer job 114 is configured to periodically execute and cause the DBMS 118 to either create or delete the database snapshots 122A-122C according to the parameters specified by the user through the user interface 200. Additional details regarding the operation of the timer job 114 are provided below with respect to FIG. 3.

Figure 3:
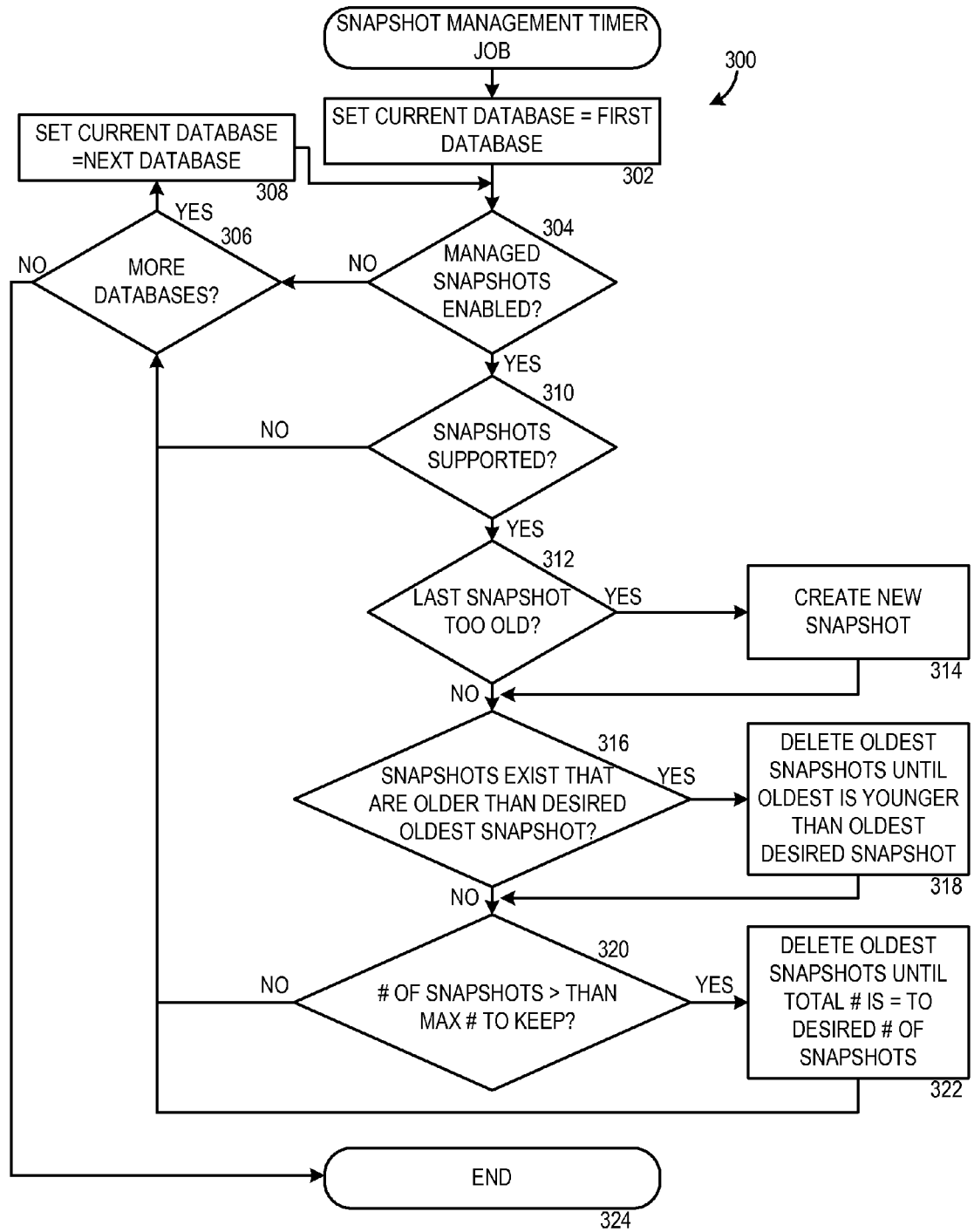
FIG. 3 is a flow diagram showing an illustrative routine that illustrates the operation of an automatically executed job for automating the management of database snapshots in one embodiment provided herein.

Turning now to FIG. 3, a routine 300 will be described that illustrates aspects of the operation of the database snapshot timer job 114. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where a temporary variable is initialized for maintaining data indicating which of the databases 120A-120C have been considered by the timer job 114. The variable is initialized to the first of the content databases 120A-120C. Once the variable has been initialized, the routine 300 proceeds to operation 304 where the timer job 114 determines whether the current database, as indicated by the temporary variable, has managed snapshots enabled. If not, the routine 300 proceeds from operation 304 to operation 306, where a determination is made as to whether additional databases 120A-120C remain to be considered. If not, the routine 300 proceeds from operation 306 to operation 324, where it ends. If additional databases 120 remain to be considered, however, the routine 300 proceeds from operation 306 to operation 308 where the temporary variable is incremented to identify the next database. The routine 300 then proceeds from operation 308 to operation 304, described above.

If, at operation 304, the timer job 114 determines that snapshots are enabled for the current database, the routine 300 proceeds to operation 310. At operation 310, the timer job 114 determines whether the DBMS 118 supports snapshots for the current database. If not, the routine 300 proceeds from operation 310 to operation 306, described above. If snapshots are supported, however, the routine 300 proceeds from operation 310 to operation 312.

At operation 312, the timer job 114 determines whether the last snapshot taken on the current database is too old. In particular, the timer job 114 determines whether the difference between the newest snapshot taken on the current database and the current time is greater than the frequency specified through the user interface control 208. If so, the routine 300 proceeds to operation 314 where a new snapshot is taken for the current database. As discussed above, the timer job 114 transmits an instruction to the DBMS 118 that causes the DBMS 118 to create the snapshot. From operation 314, the routine 300 proceeds to operation 316.

If, at operation 312, the timer job 114 determines that the last snapshot is not too old, the routine 300 proceeds from operation 312 to operation 316. At operation 316, the timer job 114 determines whether snapshots exist for the current database that are older than the desired oldest snapshot as specified through the user interface control 212 described above. If so, the routine 300 proceeds from operation 316 to operation 318 where the oldest snapshots for the current database are deleted until the oldest snapshot is younger than the oldest desired snapshot. As discussed above, the timer job 114 transmits instructions to the DBMS 118 that will cause the DBMS 118 to delete the desired snapshots. From operation 318, the routine 300 proceeds to operation 320.

If, at operation 316, the timer job 114 determines that snapshots do not exist for the database that are older than the desired oldest snapshot, the routine 300 proceeds from operation 316 to operation 320. At operation 320, the timer job 114 determines whether the number snapshots in existence for the current database is greater than the maximum number of snapshots to be kept as specified through the user interface control 206, described above. If not, the routine 300 proceeds from operation 320 to operation 306, described above. If so, however, the routine 300 proceeds from operation 320 to operation 322.

At operation 322, the oldest snapshots are deleted until the total number of snapshots in existence for the current database is equal to the desired number of snapshots as specified through the user interface control 206. In order to delete snapshots, the timer job 114 transmits the appropriate instructions to the DBMS 118 in the manner described above. From operation 322, the routine 300 returns to operation 306, described above.

Referring now to FIG. 4, additional details will be provided regarding the functionality provided by the user interface 112 for allowing a user to manually manage the creation, deletion, and restoration of the database snapshots 122A-122C. In particular, FIG. 4 shows an illustrative user interface 400 provided by the platform 108 for allowing a user to manually manage the database snapshots 122A-122C.

In one implementation, the user interface 400 includes a control 402 through which a user can select the application 110A-110C for which the database snapshots 122 should be managed. In response to a selection of one of the applications 110A-110C using the control 402, the columns 410A-410C of the user interface 400 are populated. The column 410A shows the name of the content database 120A-120C for which a snapshot has been taken. The column 410B shows the name of each snapshot and the column 410C shows the time and date at which the respective database snapshot 122 was taken. In this manner, the user interface 400 provides a concise description of all of the database snapshots 122A-122C that have been taken for one of the applications 110A-110C. It should be appreciated that the data illustrated in columns 410A-410C reflect all of the snapshots maintained by the DBMS 118 for an application regardless of whether the snapshots were taken in response to instructions received from the timer job 114 or in response to manual instructions provided by a user through the user interface 400.

According to implementations, the user interface 400 also includes a number of user interface controls through which a user can request to manually create database snapshots 122, delete the database snapshots 122, or restore the database snapshots 122 to the appropriate content database 120. For instance, in the illustrative screen display shown in FIG. 4, a user interface control 404 may be selected to cause the DBMS 118 to create a snapshot of all of the databases for the selected application 110. A user interface control 406 may be selected in a similar manner to cause the DBMS 118 to delete all of the snapshots 122A-122C that have been created for a particular application 110. In response to such requests, the platform 108 transmits an appropriate instruction to the DBMS 118 to create or delete the desired snapshots 122. According to one implementation, a control 408 is also provided for refreshing the display shown in the user interface 400. This may be helpful, for instance, to display data regarding any snapshots created or deleted by the timer job 114 since the previous display of the user interface 400.

As shown in FIG. 5, the user interface 400 also includes functionality for creating a single new snapshot for a particular content database 120 and for deleting all of the snapshots taken for a particular content database 120. In particular, in one implementation a database name may be selected to display a drop down menu 504. The drop down menu 504 includes items for creating a new snapshot for the selected content database and for deleting all of the database snapshots 122 for the selected content database.

According to one implementation, the user interface 400 also includes functionality for exploring or recovering data from a single database snapshot 122, deleting a single database snapshot 122, or restoring a single database snapshot 122 to the appropriate content database 120. In particular, a snapshot name shown in the user interface 400 may be selected using an appropriate user input device. In response thereto, the menu 502 is displayed.

The menu 502 includes items for exploring or recovering data, deleting the snapshot, or restoring the selected snapshot to the appropriate content database 120. In response to receiving a selection of an item for deleting the selected snapshot, the platform 108 transmits a request to the DBMS 118 to delete the appropriate snapshot. Similarly, in response to the selection of an item within the menu 502 for restoring a database snapshot 122, the platform 108 transmits a request to the DBMS 118 to restore the selected snapshot onto the corresponding content database 120.

Figure 6:
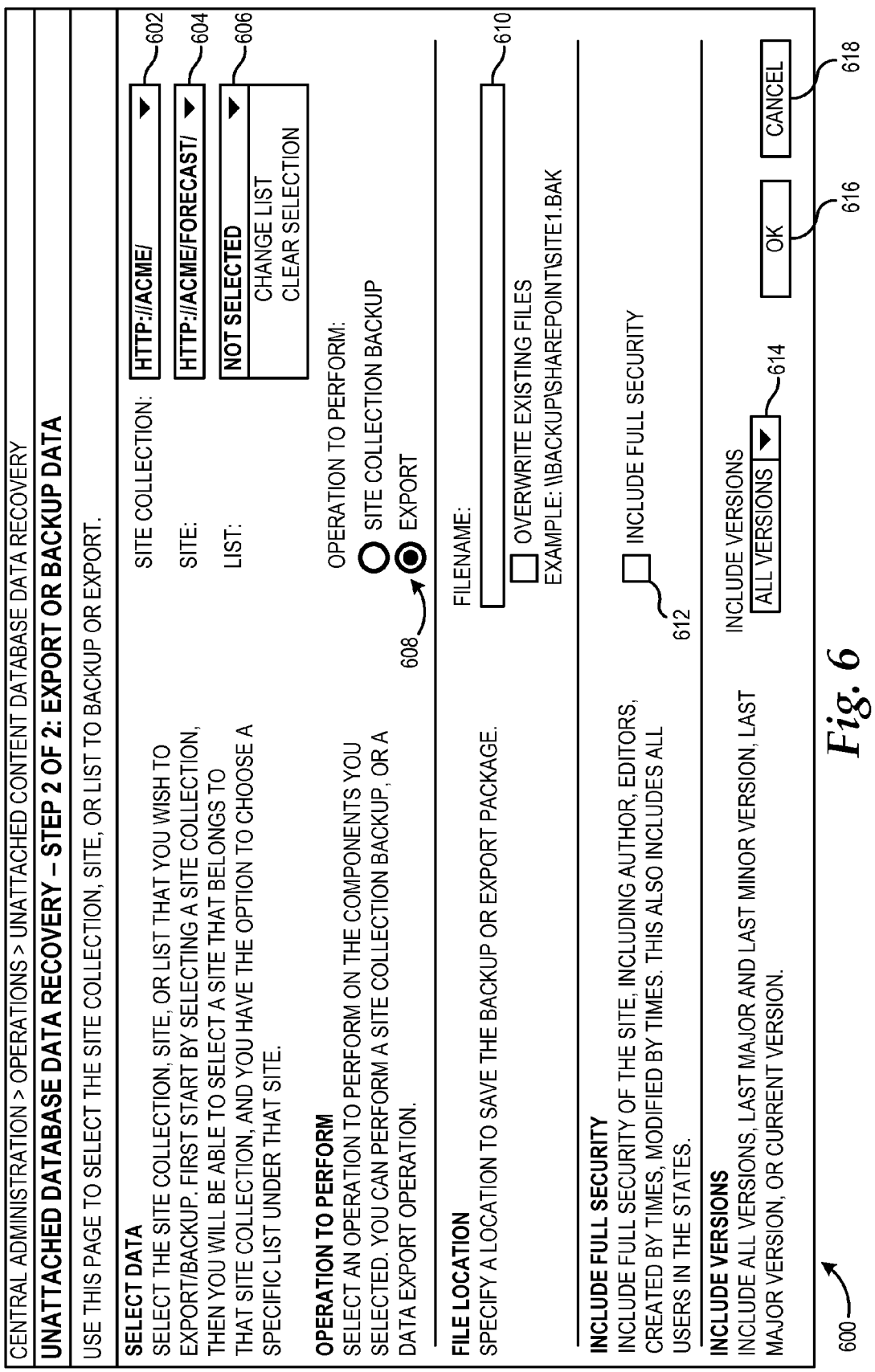
FIG. 6 is a user interface diagram showing aspects of a user interface provided in one embodiment for restoring data from a database snapshot.

In response to receiving a selection of an item in the menu 502 for recovering data from the selected database snapshot 122, the user interface 600 shown in FIG. 6 is displayed. The user interface 600 provides functionality for allowing a user to specify the data that should be recovered from one of the selected database snapshots 122. Through the user interface 600, a user can specify parameters that define the data that should be retrieved. For instance, utilizing the user interface controls 602, 604, and 606, a user can specify a site collection, site, and lists that should be retrieved from the selected database snapshot 122.

Utilizing the user interface controls 608 and 610, a user can also specify that the identified data should be exported from the selected database snapshot 122 and stored in a specified location. The controls 612 and 614 may be utilized to specify whether the full security of the selected data should be included and whether all versions or some subset of version should be included in the exported data. If the user selects the user interface control 616, the specified data is retrieved from the selected database snapshot 122 and stored in the specified location. The restored data may then be imported back into an appropriate content database 120 or utilized in another fashion. A control 618 is also provided in the user interface 600 for cancelling the data recovery operation. In embodiments, the functionality accessible through the user interfaces described herein may also be accessed through a command line or a programmable object model.

Figure 7:
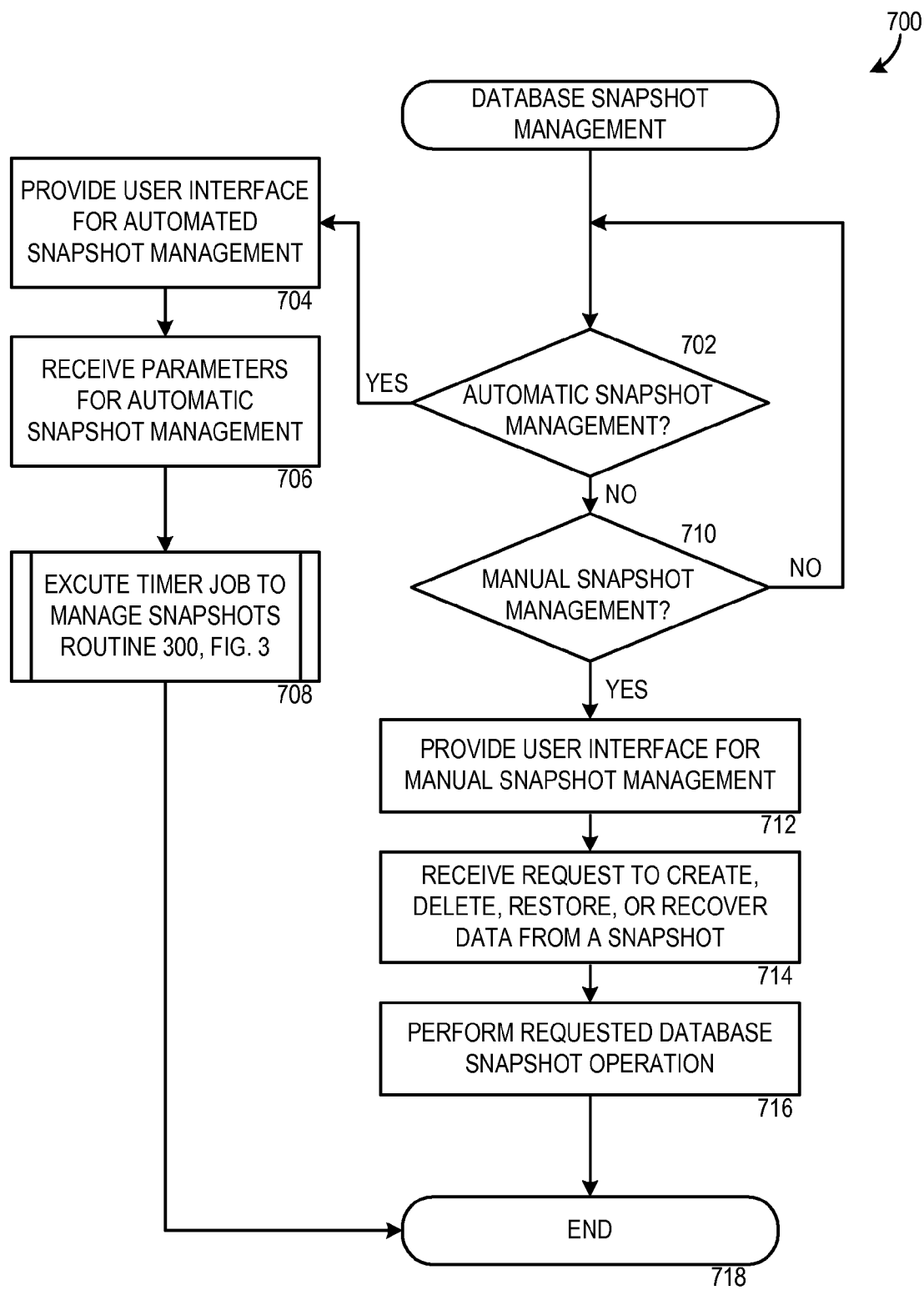
FIG. 7 is a flow diagram showing an illustrative routine that illustrates aspects of various embodiments provided herein for managing database snapshots.

Turning now to FIG. 7, additional details will be provided regarding the processes presented herein for managing the database snapshots 122A-122C. In particular, FIG. 7 shows a routine 700 illustrating one overall process for managing the manual and automated creation of the database snapshots 122A-122C in one embodiment provided herein.

The routine 700 begins at operation 702, where a determination is made as to whether a user has requested automatic snapshot management. If so, the routine 700 proceeds to operation 704 where the user interface 200 described above with reference to FIG. 2 is provided for specifying the parameters defining how the database snapshots 122A-122C should be managed by the timer job 114. The routine 700 then proceeds to operation 706 where parameters are received through the user interface 200.

From operation 706, the routine 700 then proceeds to operation 708 where the timer job 114 is executed in order to cause the DBMS 118 to create and delete the database snapshots 122A-122C in the manner specified through the user interface 200. An illustrative routine illustrating the operation of the timer job 114 was discussed above with respect to FIG. 3. From operation 708, the routine 700 proceeds to operation 718, where it ends.

If, at operation 702, it is determined that the user has not requested automatic snapshot management, the routine 700 proceeds to operation 710. At operation 710, a determination is made as to whether the user has requested to manually manage the snapshots 122A-122C. If not, the routine 700 returns to the operation 702 described above. If the user has requested to manually manage the database snapshots 122A-122C, the routine 700 proceeds to operation 712.

At operation 712, the user interface 400 described above is provided for manually managing the creation, deletion, restoration, and recovery of the database snapshots 122A-122C. The routine 700 then proceeds to operation 714, where user input is received requesting the creation, deletion, restoration, or recovery of data from one of the database snapshots 122A-122C. For instance, the user interface controls 404, 408, 406, and the menus 502 and 504 may be utilized to receive such input. In response to receiving this input, the routine 700 proceeds to operation 716, where the platform 108 provides instructions to the DBMS 118 to perform the operation requested by the user through the user interface 400. Once the requested operation has been performed, the routine 700 continues from operation 716 to operation 718, where it ends.

Figure 8:
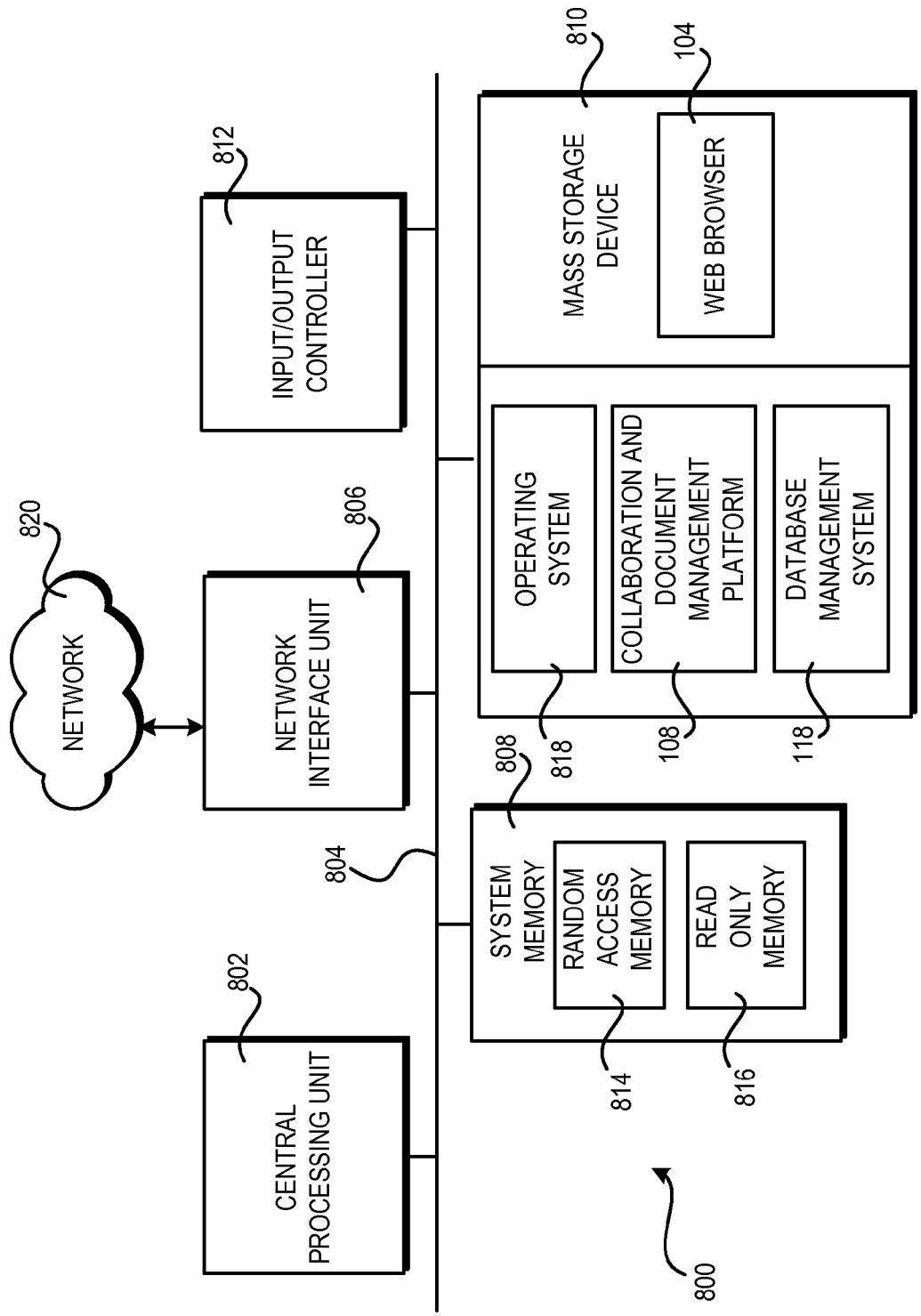
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein for database snapshot management in the manner presented above. The computer architecture shown in FIG. 8 illustrates a conventional desktop, laptop, or server computer and may be utilized to embody the client computer 102 or a server computer capable of executing the collaboration and document management platform 108 and the DBMS 118.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store software components for implementing the collaboration and document management platform 108 and the DBMS 118, each of which was described in detail above with respect to FIGS. 1-7. When used to embody the client computer 102, the mass storage device 810 and the RAM 814 may also store the Web browser 104 and other types of program modules. The mass storage device 810 may also be utilized to store the content databases 120A-120C and the database snapshots 122A-122C.

Based on the foregoing, it should be appreciated that technologies for database snapshot management are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for database snapshot management, the method comprising:
providing a first user interface for managing automated creation of one or more database snapshots of a content database by a database management system;
receiving by way of the first user interface a parameter defining a frequency with which the database snapshots are to be created;
executing a timer job to determine if a difference between a time associated with a newest database snapshot and a current time is greater than a time between creation of the database snapshots, the time corresponding to the frequency specified by way of the first user interface; and
creating the one or more database snapshots in response to determining that the difference is greater than the time corresponding to the frequency specified by way of the first user interface.

2. The method of claim 1, wherein one of the parameters comprises a parameter defining a maximum number of database snapshots that are to be maintained.

3. The method of claim 1, wherein one of the parameters comprises a parameter defining a maximum period of time the database snapshots are to be maintained prior to deletion.

4. The method of claim 1, wherein one of the parameters comprises a parameter defining an application for which the database snapshots are to be created and deleted.

5. The method of claim 1, wherein one of the parameters comprises a parameter defining a location for storing the database snapshots.

6. The method of claim 1, further comprising providing a second user interface, the second user interface being configured to allow a user to manually manage the creation, deletion, and restoration of the database snapshots.

7. The method of claim 6, further comprising:
receiving a request by way of the second user interface to create a database snapshot; and
in response to receiving the request, transmitting an instruction to the database management system to create a new database snapshot.

8. The method of claim 6, further comprising:
receiving a request by way of the second user interface to delete a database snapshot; and
in response to receiving the request, transmitting an instruction to the database management system to delete a database snapshot.

9. The method of claim 6, further comprising:
receiving a request by way of the second user interface to restore a database snapshot; and
in response to receiving the request, transmitting an instruction to the database management system to restore a database snapshot.

10. The method of claim 6, further comprising:
receiving a request by way of the second user interface to recover data from one of the database snapshots; and
in response to receiving the request, providing a third user interface, the third user interface being configured to allow a user to specify data that is to be recovered from the one of the database snapshots, receiving parameters by way of the third user interface, and recovering data from the one of the database snapshots according to the parameters specified by way of the third user interface.

11. A computer storage medium having computer executable instructions stored thereon which, when executed by a computer, cause the computer to:
provide a first user interface for managing automated creation of one or more database snapshots of a content database by a database management system;
receive by way of the first user interface a parameter defining a frequency with which the database snapshots are to be created;
execute a timer lob to determine if a difference between a time associated with a newest database snapshot and a current time is greater than a time between creation of the database snapshots, the time corresponding to the frequency specified by way of the first user interface; and
create the one or more database snapshots in response to determining that the difference is greater than the time corresponding to the frequency specified by way of the first user interface.

12. The computer storage medium of claim 11, having further computer executable instructions stored thereon which, when executed by a computer, cause the computer to:
receive a request by way of the second user interface to recover data from one of the database snapshots; and
in response to receiving the request, to provide a third user interface, the third user interface being configured to allow a user to specify data that is to be recovered from the one of the database snapshots, receiving parameters by way of the third user interface, and recovering data from the one of the database snapshots according to the parameters specified by way of the third user interface.

13. The computer storage medium of claim 11, having further computer executable instructions stored thereon which, when executed by a computer, cause the computer to:
receive one or more parameters by way of the first user interface, the parameters defining the manner in which the one or more database snapshots are to be created and deleted; and to
execute a timer job configured to manage the creation and deletion of the database snapshots according to the parameters.

14. The computer storage medium of claim 13, wherein one of the parameters comprises a parameter defining a maximum number of database snapshots that are to be maintained.

15. The computer storage medium of claim 11, wherein one of the parameters comprises a parameter defining a maximum period of time the database snapshots are to be maintained prior to deletion.

16. The computer storage medium of claim 15, wherein one of the parameters comprises a parameter defining an application for which the database snapshots are to be created and deleted.

17. A system for database snapshot management, the system comprising:
a database management system capable of creating one or more database snapshots for a content database; and
a computing system executing a collaboration and document management platform to
provide a first user interface for managing the automated creation of the one or more database snapshots,
receive by way of the first user interface a parameter defining a frequency with which the database snapshots are to be created,
execute a timer job to determine if a difference between a time associated with a newest database snapshot and a current time is greater than a time between creation of the database snapshots, the time corresponding to the frequency specified by way of the first user interface, and
communicate with the database management system to create the one or more database snapshots in response to determining that the difference is greater than the time corresponding to the frequency specified by way of the first user interface.

18. The system of claim 17, wherein execution of the collaboration and document management platform further causes the computing system to
provide a second user interface configured to allow a user to manually manage the creation, deletion, and restoration of the database snapshots,
receive a request by way of the second user interface to recover data from one of the database snapshots, and
provide a third user interface in response to receiving the request configured to allow a user to specify data that is to be recovered from the one of the database snapshots, to receive parameters by way of the third user interface, and to recover data from the one of the database snapshots according to the parameters specified by way of the third user interface.

* * * * *